US011011756B2

(12) United States Patent
Pintauro et al.

(10) Patent No.: US 11,011,756 B2
(45) Date of Patent: May 18, 2021

(54) NANOFIBER-BASED BIPOLAR MEMBRANES, FABRICATING METHODS AND APPLICATIONS OF SAME

(71) Applicant: Vanderbilt University, Nashville, TN (US)

(72) Inventors: Peter N. Pintauro, Brentwood, TN (US); Eduardo Pereira, Nashville, TN (US); Ryszard Wycisk, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 196 days.

(21) Appl. No.: 16/099,771

(22) PCT Filed: May 24, 2017

(86) PCT No.: PCT/US2017/034162
§ 371 (c)(1),
(2) Date: Nov. 8, 2018

(87) PCT Pub. No.: WO2017/205458
PCT Pub. Date: Nov. 30, 2017

(65) Prior Publication Data
US 2019/0134570 A1 May 9, 2019

Related U.S. Application Data

(63) Continuation-in-part of application No. PCT/US2017/019314, filed on Feb. 24, 2017, and a
(Continued)

(51) Int. Cl.
*H01M 8/02* (2016.01)
*H01M 8/0202* (2016.01)
(Continued)

(52) U.S. Cl.
CPC .......... *H01M 8/0202* (2013.01); *B01D 69/02* (2013.01); *B01D 69/145* (2013.01);
(Continued)

(58) Field of Classification Search
CPC ........ B01D 71/52; B01D 71/38; B01D 71/60; B01D 71/82; B01D 69/02; B01D 69/145; B01D 69/148; B01J 41/13
See application file for complete search history.

(56) References Cited

U.S. PATENT DOCUMENTS 5,993,629 A    11/1999  Gavach et al.
9,403,128 B2 *  8/2016  O'Brien ............ B01D 67/0079
(Continued)

OTHER PUBLICATIONS

S. Abdu, K. Sricharoen, J.E. Wong, E.S. Muljadi, T. Melin, and M. Wessling, Catalytic Polyelectrolyte Multilayers at the Bipolar Membrane Interface, ACS Appl. Mater. Interfaces, 5, 10445 (2013).
(Continued)

*Primary Examiner* — Amanda C. Walke
(74) *Attorney, Agent, or Firm* — Locke Lord LLP; Tim Tingkang Xia, Esq.

(57) ABSTRACT

A bipolar membrane comprising a cation exchange mat of one or more cation exchange polymers, an anion exchange mat of one or more anion exchange polymers, and an internal 3D bipolar interface, disposed between the cation and anion exchange layers, including a mixture of at least one cation exchange polymer and at least one anion exchange polymer, such that an interface of the at least one cation exchange polymer and the at least one anion exchange polymer is the internal 3D bipolar interface that has a large area, and the at least one cation exchange polymer in the 3D bipolar interface is connected to the one or more cation exchange polymers of the cation exchange layer, and the at least one anion exchange polymer in the 3D
(Continued)

Conventional BPM
(2D Junction)

(A)

Invented BPM
(3D Junction)

(B)

bipolar interface is connected to the one or more anion exchange polymers of the anion exchange layer.

24 Claims, 11 Drawing Sheets

Related U.S. Application Data continuation-in-part of application No. 15/161,838, filed on May 23, 2016, now Pat. No. 10,141,593, and a continuation-in-part of application No. 14/964,220, filed on Dec. 9, 2015, now Pat. No. 9,876,246, and a continuation-in-part of application No. 13/823,968, filed on Mar. 15, 2013, now Pat. No. 9,905,870.

(60) Provisional application No. 62/340,958, filed on May 24, 2016.

(51) Int. Cl.
| | |
|---|---|
| B01D 71/52 | (2006.01) |
| B01D 69/14 | (2006.01) |
| B01D 71/38 | (2006.01) |
| B01D 71/60 | (2006.01) |
| B01J 41/13 | (2017.01) |
| B01J 41/14 | (2006.01) |
| C08L 71/12 | (2006.01) |
| C08G 65/40 | (2006.01) |
| B01J 47/12 | (2017.01) |
| B01D 71/82 | (2006.01) |
| B01D 69/02 | (2006.01) |
| C08L 71/00 | (2006.01) |
| H01M 8/023 | (2016.01) |
| H01M 8/0245 | (2016.01) |
| B01D 61/44 | (2006.01) |
| B01D 69/12 | (2006.01) |

(52) U.S. Cl.
CPC .......... *B01D 69/148* (2013.01); *B01D 71/38* (2013.01); *B01D 71/52* (2013.01); *B01D 71/60* (2013.01); *B01D 71/82* (2013.01); *B01J 41/13* (2017.01); *B01J 41/14* (2013.01); *B01J 47/12* (2013.01); *C08G 65/4012* (2013.01); *C08G 65/4056* (2013.01); *C08L 71/00* (2013.01); *C08L 71/12* (2013.01); *H01M 8/023* (2013.01); *H01M 8/0245* (2013.01); *B01D 61/445* (2013.01); *B01D 69/12* (2013.01); *B01D 2255/2047* (2013.01); *B01D 2255/2092* (2013.01); *B01D 2255/20715* (2013.01); *B01D 2255/20738* (2013.01); *B01D 2255/702* (2013.01); *B01D 2325/14* (2013.01); *B01D 2325/16* (2013.01); *C08G 2650/40* (2013.01)

(56) References Cited

U.S. PATENT DOCUMENTS

| | | | |
|---|---|---|---|
| 9,738,984 B2* | 8/2017 | Miller | B01D 69/148 |
| 10,369,529 B2* | 8/2019 | Diallo | B01D 69/141 |
| 2007/0003817 A1 | 1/2007 | Umeda | |
| 2007/0122676 A1 | 5/2007 | Song | |
| 2010/0129730 A1 | 5/2010 | Suzuki | |

OTHER PUBLICATIONS

J. B. Ballengee and P. N. Pintauro, "Composite Fuel Cell Membranes from Dual-Nanofiber Electrospun Mats", Macromolecules, 44, 7307 (2011).
J.W. Park, R. Wycisk, P.N. Pintauro, Nafion/PVDF nanofiber composite membranes for regenerative hydrogen/bromine fuel cells, J. Membrane Sci. 490, 103 (2015).
A. Park, F. Turley, R. Wycisk, P. Pintauro, Diol-Crosslinked Electrospun Composite Anion Exchange Membranes, Journal of The Electrochemical Society 162(6) F560 (2015).
J.H. Hao, L. Yu, C. Chen, L. Li, and W. Jiang, Preparation of Bipolar Membranes. II. Journal of Applied Polymer Science, 82, 1733 (2001).
T.J. Zhou, R.Y. Chen, L.J. Chen, X. Chen, X. Zheng, and Z. Chen, Bipolar Membrane Modified by Cation/Anion Exchange Nanofibers Containing Copper Phthalocyanine Derivatives with Different Substituents, Fibers and Polymers, 15(1), 18 (2014).
J. Balster, S. Srinkantharajah, R. Sumbharaju, I. Pünt, R.G.H. Lammertink, D.F. Stamatialis, M. Wessling, Tailoring the interface layer of the bipolar membrane, Journal of Membrane Science 365, 389 (2010).
McClure, J. et al., "Experimental development of alkaline and acid-alkaline bipolar membrane electrolytes," ECS Transactions, 2015, vol. 69, No. 18, pp. 35-44.
Korean Intellectual Property Office (ISR/KR), "International Search Report for PCT/US2017/034162", Korea, dated Sep. 6, 2017.

* cited by examiner

NANOFIBER-BASED BIPOLAR MEMBRANES, FABRICATING METHODS AND APPLICATIONS OF SAME

CROSS-REFERENCE TO RELATED PATENT APPLICATIONS

This PCT application claims priority to and the benefit of U.S. Provisional Patent Application Ser. No. 62/340,958, filed May 24, 2016.

This application also is a continuation-in-part application of PCT application serial No. PCT/US2017/019314, filed Feb. 24, 2017.

This application also is a continuation-in-part application of U.S. application Ser. No. 15/161,838, filed May 23, 2016.

This application also is a continuation-in-part application of U.S. application Ser. No. 14/964,220, filed Dec. 9, 2015.

This application also is a continuation-in-part application of U.S. application Ser. No. 13/823,968, filed Mar. 15, 2013.

All of the above-identified disclosures are incorporated herein in their entireties by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [4] represents the 4th reference cited in the reference list, namely, A. Park, F. Turley, R. Wycisk, P. Pintauro, Diol-CrosslinkedElectrospun Composite Anion Exchange Membranes, Journal of The Electrochemical Society 162(6) F560 (2015).

STATEMENT AS TO RIGHTS UNDER FEDERALLY-SPONSORED RESEARCH

This invention was made with government support under Contract No. CBET-1032948 awarded by the National Science Foundation. The government has certain rights in the invention.

FIELD OF THE INVENTION

The present invention relates generally to the field of materials, and more specifically related to nano- or micro-fiber-based bipolar membranes, fabricating methods and applications of same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

A bipolar membrane (BPM), typically a laminate of anion-exchange and cation-exchange membranes, has the unique capability to split water at a potential as low as 0.8 V while conventional electrolysis requires at least 1.2 V. BPMs are employed in a number of important industrial processes, including the production of mineral acids, the recovery of organic acids from fermentation processes, pH control, and ion-exchange resin regeneration. The use of BPMs in electrodialysis separations eliminates unwanted salt efflux and disposal problems and offers significant savings in electrical energy consumption. Recently, BPMs have also been examined for use in self-humidifying hydrogen/air fuel cells, where the recombination of electrochemically generated hydroxide ions and protons at the bipolar junction produces water that improves membrane and electrode binder hydration, with higher power output at reduced feed gas humidity conditions.

In spite of their technological and commercial importance, present-day bipolar membranes suffer from a number of structural and performance deficiencies. Bipolar membranes are fabricated by physically attached pre-fabricated anion-exchange and cation-exchange ionomer films, with water splitting at the planar 2D interface of the two membrane sheets. Delamination (ballooning) can occur at this interface due to pressure build-up during start-ups and shut-downs of batch-type electrodialysis separations. Poor coion permselectivity, the poor chemical stability of anion exchange membrane polymer layers, and membrane dehydration, where the rate of water splitting at the bipolar junction exceeds the water diffusion flux to the junction, are additional issues that lead to poor current utilization and significant product contamination when PBMs are used in electrodialaysis separations.

Therefore, a heretofore unaddressed need exists in the art to address the aforementioned deficiencies and inadequacies.

SUMMARY OF THE INVENTION

In one aspect, the present invention relates to a bipolar membrane comprising an internal 3-dimensional (3D) bipolar interface (junction). A 3D bipolar interface or junction refers to a region/layer within a bipolar membrane, parallel to the membrane surface, spanning the entire cross section of the membrane, and of finite thickness (ranging from less than 1 micron to 25 microns or more) where there is interpenetration of cation-exchange polymer and anion-exchange polymer domains or fibers. The resulting interpenetrating polymer morphology creates a high area bipolar interface (where anion and cation exchange polymers are in near or close contact). The 3D bipolar junction region/layer may have some micro/nanoporosity or be completely dense with no void space. Catalyst particles may also be co-located in the 3D junction layer. One way to create a 3D bipolar interface is to simultaneously form and deposit (e.g., via electrospinning) cation exchange polymer fibers and anion exchange polymer fibers on a common collector surface, followed by suitable processing of the resulting fiber mat to remove some/all of the void space between fibers.

In one embodiment, the bipolar membrane further comprises a first layer, a second layer, and a third layer. The first layer comprises a cation exchange region formed of one or more cation exchange polymers. The third layer comprises an anion exchange region formed of one or more anion exchange polymers. The second layer, disposed between the first layer and the third layer, comprises a mixture of at least one cation exchange polymer and at least one anion exchange polymer, such that an interface of the at least one cation exchange polymer and the at least one anion exchange polymer construes the internal 3D bipolar interface that has a large area, and the at least one cation exchange polymer in the second layer is connected to the one or more cation exchange polymers of the first layer, and the at least one anion exchange polymer in the second layer is connected to the one or more anion exchange polymers of the third layer.

In one embodiment, the at least one cation exchange polymer in the second layer is same as or different from the one or more cation exchange polymers of the first layer, and the at least one anion exchange polymer in the second layer is same as or different from the one or more anion exchange polymers of the third layer.

In one embodiment, the internal 3D bipolar interface comprises a mixture of cation exchange and anion exchange nanofibers or microfibers.

In one embodiment, the internal 3D bipolar interface comprises a composite of cation exchange polymer nanofibers or microfibers embedded in anion-exchange polymer matrix.

In one embodiment, the internal 3D bipolar interface comprises a composite of anion exchange polymer nanofibers or microfibers embedded in cation-exchange polymer matrix.

In one embodiment, the one or more cation exchange polymers of the first layer comprise at least one of polymers containing protogenic groups including sulfonic, sulfonimide, phosphonic and carboxylic, and their derivatives.

In one embodiment, the one or more cation exchange polymers of the first layer comprise at least one of poly (arylene ether sulfonic acid), poly(phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers, poly (vinylphosphonic acid), poly(acrylic acid), poly(methacrylic acid) and their copolymers, carboxyphenoxymethylpolysulfone, and their derivatives.

In one embodiment, the perfluorosulfonic acid polymers comprise Nafion®, Aquivion®, or their derivatives.

In one embodiment, the one or more cation exchange polymers of the first layer comprise sulfonated poly(ether ether ketone) (SPEEK).

In one embodiment, the one or more anion exchange polymers of the third layer comprise at least one of polymers containing positive fixed charge groups including quaternary ammonium, guanidinium, phosphonium, and their derivatives.

In one embodiment, the one or more anion exchange polymers of the third layer comprise at least one of polymers based on polyarylene or on aliphatic hydrocarbon backbone.

In one embodiment, the one or more anion exchange polymers of the third layer comprises quaternized poly (phenylene oxide) (QPPO).

In one embodiment, the first layer comprises a mixture of two or more cation exchange polymers, and wherein the third layer comprises a mixture of two or more anion exchange polymers.

In one embodiment, each of the first layer and the third layer comprises uncharged particles for improving mechanical strength and/or increasing ionic conductivity, wherein the uncharged particles comprise graphene, graphene oxide, carbon nanotubes, short polymer fibers, and sulfonated or aminated polyhedral oligomeric silsesquioxane (POSS) nanoparticles.

In one embodiment, a polymer blend of an anion exchange ionomer with one or more charged or uncharged polymers is employed in any of the first, second and third layers.

In one embodiment, a polymer blend of a cation exchange ionomer with one or more charged or uncharged polymers is employed in the first, second and third layers.

In one embodiment, at least one of the first, second and third layers is further reinforced with polymer fibers being made of an ion-exchange or uncharged polymer including poly(phenyl sulfone) or poly(phenylene oxide), poly(vinylidene fluoride).

In one embodiment, the 3D bipolar interface comprises catalyst particles.

In one embodiment, the catalyst particles comprise inorganic and organic particles, or polymers.

In one embodiment, the catalyst particles comprise poly (vinyl pyridine), poly(ethylene imine), poly(vinyl alcohol), poly(acrylic acid), silica, functionalized silica, $Al(OH)_3$, $Fe(OH)_3$, $Fe_2O_3$, $Ca(OH)_2$, $Mg(OH)_2$, $FeCl_3$, $RuCl_3$, $Cr(NO_3)_3$, $ZrO_2$, sodium metasilicate, graphene oxide and polymers or particles with phosphoric or phosphonic acid groups.

In one embodiment, the internal 3D bipolar interface is a junction layer of interpenetrating polymer nanofibers or microfibers of anion-exchange polymer and cation-exchange polymer, with or without catalyst particles.

In one embodiment, the interpenetrating polymer fiber junction layer has no void space between the fibers.

In one embodiment, the interpenetrating polymer fiber junction layer has some void space between the fibers.

In certain aspects, the invention relates to a fuel cell and/or a electrochemical device, each of which comprises at least one bipolar membrane as disclosed above.

In another aspect, the invention relates to a method of fabricating a bipolar membrane. In one embodiment, the method includes forming a first layer of one or more cation exchange polymers, a second layer of a mixture of at least one cation exchange polymer and at least one anion exchange polymer, and a third layer one or more anion exchange polymers, wherein the second layer is disposed between the first layer and the third layer, thereby defining a bipolar membrane structure; exposing the bipolar membrane structure to dimethylformamide (DMF) vapor dimethylacetamide (DMAc) vapor or alcohol vapor; and hot-pressing the exposed bipolar membrane structure to fabricate the bipolar membrane. The bipolar membrane has an internal 3D bipolar interface with a large area construed of the at least one cation exchange polymer and the at least one anion exchange polymer. The at least one cation exchange polymer in the second layer is connected to the one or more cation exchange polymers of the first layer, and the at least one anion exchange polymer in the second layer is connected to the one or more anion exchange polymers of the third layer.

In one embodiment, the first and third layers are formed by solution casting of dense films or impregnation of reinforcing mats with cation-exchange and anion-exchange polymer solutions.

In one embodiment, the forming step comprises electrospinning a first solution containing the one or more cation exchange polymers to form the first layer; concurrent co-electrospinning the first solution and a second solution containing one or more anion exchange polymers directly onto the first layer to form the second layer; and electrospinning the second solution directly onto the second layer to form third layer.

In one embodiment, the method further comprises depositing catalyst particles into the second layer, by electro spinning, electro spraying, airbrushing, or piezoelectric spraying.

In one embodiment, the forming step comprises electrospinning a first solution containing the one or more cation exchange polymers to form the first layer; co-electrospinning the first solution and a second solution containing one or more anion exchange polymers to form the second layer while continuously electrospraying an aqueous suspension of catalyst particles; electrospinning the second solution to form the third layer; and stacking the second layer on the first layer and the third layer on the second layer to define the bipolar membrane structure.

In yet another aspect, the invention relates to a method of fabricating a bipolar membrane. In one embodiment, the method comprises electrospinning electrospinning a first solution containing the one or more cation exchange polymers to form a cation exchange mat; electrospraying an aqueous suspension of catalyst particles on the cation exchange mat; electrospining a second solution containing one or more anion exchange polymers on the electrosprayed catalyst particles to form a two-layer mat; and processing the two-layer mat by exposing to methanol, ethanol, dimethylacetamide (DMAc) or DMF vapor followed by hot pressing.

In one embodiment, the one or more cation exchange polymers comprise at least one of polymers containing protogenic groups including sulfonic, sulfonimide, phosphonic and carboxylic, and their derivatives.

In one embodiment, the one or more cation exchange polymers comprise at least one of poly(arylene ether sulfonic acid), poly(phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers, poly(vinylphosphonic acid), poly(acrylic acid), poly(methacrylic acid) and their copolymers, carboxyphenoxymethylpolysulfone, and their derivatives.

In one embodiment, the perfluorosulfonic acid polymers comprise Nation®, Aquivion®, or their derivatives.

In one embodiment, the one or more cation exchange polymers of the first layer comprises sulfonated poly(ether ether ketone) (SPEEK).

In one embodiment, the one or more anion exchange polymers comprise at least one of polymers containing positive fixed charge groups including quaternary ammonium, guanidinium, phosphonium, and their derivatives).

In one embodiment, the one or more anion exchange polymers comprise at least one of polymers based on polyarylene or on aliphatic hydrocarbon backbone.

In one embodiment, the one or more anion exchange polymers comprise quaternized poly(phenylene oxide) (QPPO).

In one embodiment, the catalyst particles comprise inorganic and organic particles, or polymers.

In one embodiment, the catalyst particles comprise poly (vinyl pyridine), poly(ethylene imine), poly(vinyl alcohol), poly(acrylic acid), silica, functionalized silica, $Al(OH)_3$, $Fe(OH)_3$, $Fe_2O_3$, $Ca(OH)_2$, $Mg(OH)_2$, $FeCl_3$, $RuCl_3$, $Cr(NO_3)_3$, $ZrO_2$, sodium metasilicate, graphene oxide and polymers or particles with phosphoric or phosphonic acid groups.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
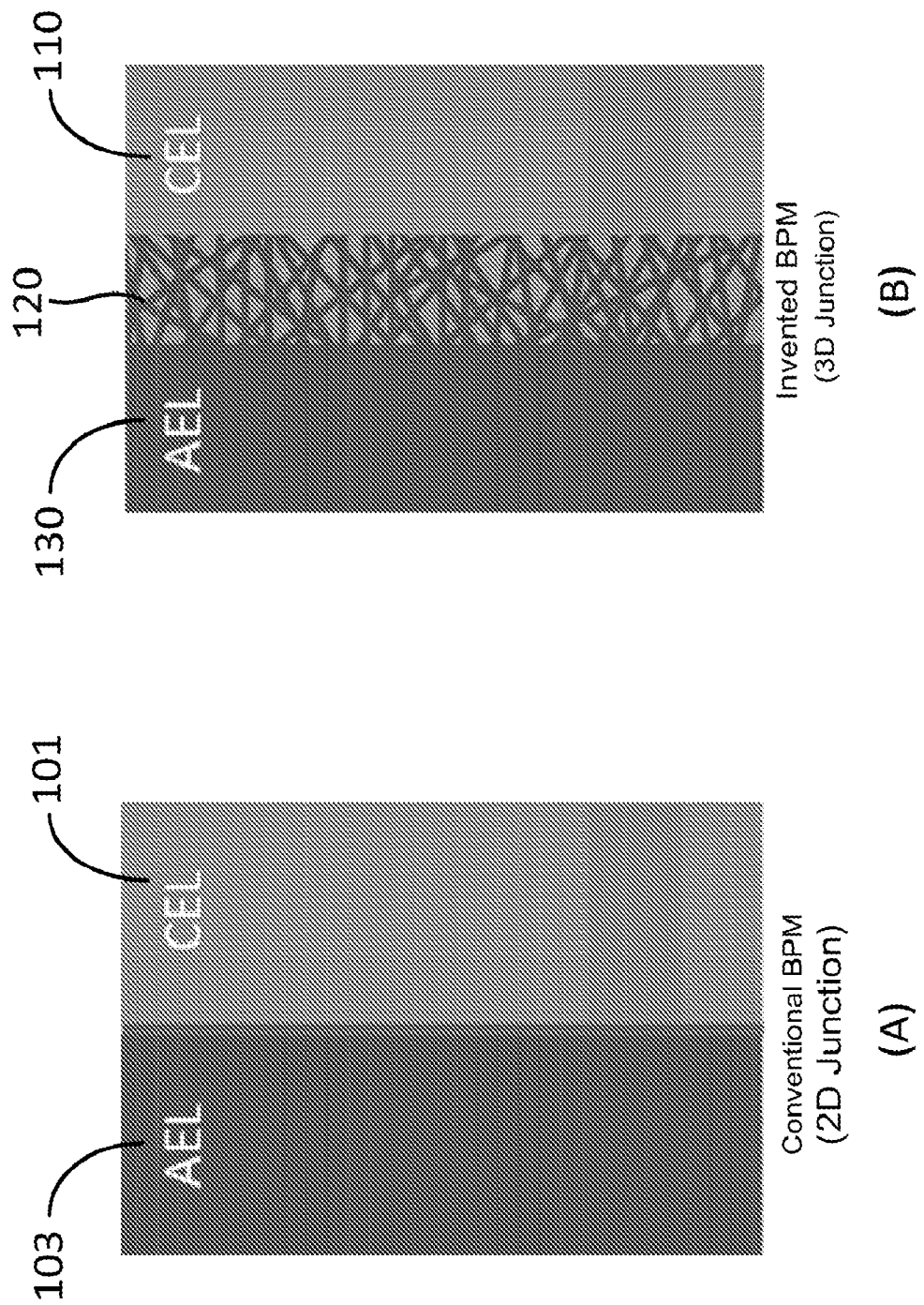
FIG. 1 shows schematic of (A) a convention bipolar membrane with a 2-D junction and (B) a bipolar membrane with a 3D nanofiber junction according to one embodiment of the invention. AEL denotes the anion-exchange polymer layer and CEL denotes the cation exchange polymer layer. There is interpenetration of the two layers within the 3D junction region.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising", "include" or "including", "carry" or "carrying", "has/have" or "having", "contain" or "containing", "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the invention.

As used herein, the term "AEL" denotes an anion-exchange layer generally made of ionomers and designed to conduct anions, and the term "CEL" denotes a cation exchange layer generally made of ionomers and designed to conduct cations.

As used herein, the term "conducting polymer" or "ionomer" generally refers to a polymer that conducts ions. More precisely, the ionomer refers to a polymer that includes repeat units of at least a fraction of ionized units. As used herein, the term "polyelectrolyte" generally refers to a type of ionomer, and particularly a polymer whose repeating units bear an electrolyte group, which will dissociate when the polymer is exposed to aqueous solutions (such as water), making the polymer charged. The conducting polymers, ionomers and polyelectrolytes may be generally referred to as "charged polymers". As used herein, the terms "polyelectrolyte fiber" or "charged polymer fiber" generally refer to the polymer fiber formed by polyelectrolytes or the likes. As used herein, polyelectrolyte, ionomer, and charged polymer can be used interchangeably.

As used herein, the terms "uncharged polymer" or "uncharged (or minimally charged) polymer" generally refer to the polymer that does not effectively conduct ions, particularly to the polymer whose repeating units do not bear an electrolyte group or bear a small number of electrolyte groups, and thus the polymer will not be charged or will have a very small charge when being exposed to aqueous solutions. As used herein, the terms "uncharged polymer fiber" or "uncharged (or minimally charged) polymer fiber" generally refer to the polymer fiber formed by the uncharged/uncharged (or minimally charged) polymer.

The description is now made as to the embodiments of the invention in conjunction with the accompanying drawings. Although various exemplary embodiments of the present invention disclosed herein may be described in the context of a bipolar membrane (BPM) having an internal 3-dimensional (3D) bipolar interface (junction) formed between an anion exchange layer and a cation exchange layer and their applications, it should be appreciated that aspects of the present invention disclosed herein are not limited to being used in connection with one particular type of bipolar membranes such as nano- or micro-fiber-based 3D junction bipolar membranes fabricated by an electrospinning process and may be practiced in connection with other types of bipolar membranes or other types of electrochemical devices such as fuel cells, capacitors and/or batteries without departing from the scope of the present invention disclosed herein.

Conventionally, a bipolar membrane (BPM) is an ion exchange membrane having a cation exchange layer 101 and an anion exchange layer 102, as shown in FIG. 1(A). Applying the bipolar membrane with DC current, water can be split inside the membrane and then proton ($H^+$) and hydroxide ion ($OH^-$) are generated. This unique function of water splitting is utilized for production of an acid and a base from a corresponding salt in combination with conventional monopolar ion exchange membrane.

Prior attempts at increasing the interfacial junction area between the anion exchange layer and the cation exchange layer in a bipolar membrane produced minimal or no improvements in membrane performance (i.e., the ability to have high current density at a low operating voltage). Such prior attempts focused on increasing the interfacial area via macroscopic roughness or the creation of corrugated interface geometry, the placement of ion-exchange particles (beads) at the interface, and layer-by-layer multi-junction formation [1]. In general, these studies produced membranes with poor ionic conductivity (percolation issues) within the interfacial composite layer due to insufficient interpenetration of oppositely charged polymers and/or the presence of residual porosity.

In certain aspects, the present invention relates to a bipolar membrane including an electrospun 3D water splitting junction interpenetrated between the anion-exchange layer (AEL) and the cation-exchange layer (CEL). The extended electrospun 3D junction leads to improvements in the membrane selectivity (to separate protons and hydroxide ions) and the rate of water splitting (high current densities with a low transmembrane voltage drop), and also leads to greater delamination resistance, due to mechanical interlocking of the two polymer sides of the bipolar membrane.

Referring to FIG. 1(B), in the exemplary embodiment, the bipolar membrane having an extended 3D water splitting junction region 120 between the cation exchange layer 110 and the anion exchange layer 130, where there is interpenetration of the two cation and anion exchange layers 110 and 130 within the 3D junction region 120. Such bipolar membrane has an increased interfacial area for water splitting at the junction 120 of the cation exchange polymer layer 110 and the anion exchange polymer layer 130. This morphology is important for at least two reasons: (1) it improves the attachment (adhesion) of the two ion-exchange layers so that ballooning/delamination is minimized or eliminated and (2) the increased bipolar junction area leads to better distribution of the water splitting reaction and lower membrane voltage drop for the same operating current density.

In certain embodiments, the cation exchange layer (mat) 110 of the bipolar membrane is formed of one or more cation exchange polymers. The anion exchange layer (mat) 130 of the bipolar membrane is formed of one or more anion exchange polymers. The 3D junction layer (region) 120 of the bipolar membrane is formed of a mixture of at least one cation exchange polymer and at least one anion exchange polymer and corresponds to an internal 3D bipolar interface of the at least one cation exchange polymer and the at least one anion exchange polymer, which has a large area. Further, the at least one cation exchange polymer in the 3D junction layer 120 is connected to the one or more cation exchange polymers of the cation exchange layer 110, and the at least one anion exchange polymer in the 3D junction layer 120 is connected to the one or more anion exchange polymers of the anion exchange layer 130, as shown in FIG. 1(B).

In certain embodiments, the at least one cation exchange polymer in the 3D junction layer 120 is same as or different from the one or more cation exchange polymers of the cation exchange layer 110, and the at least one anion exchange polymer in the 3D junction layer 120 is same as or different from the one or more anion exchange polymers of the anion exchange layer 130.

In certain embodiments, the cation exchange layer 110 includes the cation exchange nano- or micro-fibers. The anion exchange layer 130 includes the anion exchange nano- or micro-fibers. The internal 3D bipolar interface (junction) 120 includes a mixture of cation exchange and anion exchange nano- or micro-fibers.

In one embodiment, the one or more cation exchange polymers of the cation exchange layer 110 include at least one of polymers containing protogenic groups including sulfonic, sulfonimide, phosphonic and carboxylic, and their derivatives.

In one embodiment, the one or more cation exchange polymers include at least one of poly(arylene ether sulfonic acid), poly(phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers, poly(vinylphosphonic acid), poly(acrylic acid), poly(methacrylic acid) and their copolymers, carboxyphenoxymethylpolysulfone, and their derivatives.

In one embodiment, the perfluorosulfonic acid polymers comprises Nafion®, Aquivion®, or their derivatives.

In one embodiment, the one or more cation exchange polymers include sulfonated poly(ether ether ketone) (SPEEK).

In one embodiment, the one or more anion exchange polymers of the anion exchange layer 130 include at least one of polymers containing positive fixed charge groups including quaternary ammonium, guanidinium, phosphonium, and their derivatives.

In one embodiment, the one or more anion exchange polymers include at least one of polymers based on polyarylene or on aliphatic hydrocarbon backbone.

In one embodiment, the one or more anion exchange polymers includes quaternized poly(phenylene oxide) (QPPO).

In certain embodiments, the cation exchange layer 110 includes a mixture of two or more cation exchange polymers, and wherein the anion exchange layer 130 includes a mixture of two or more anion exchange polymers.

In one embodiment, each of the cation exchange layer 110 and the anion exchange layer 130 includes uncharged particles for improving mechanical strength and/or increasing ionic conductivity, where the uncharged e particles includes graphene, graphene oxide, carbon nanotubes, short polymer fibers, and sulfonated or aminated polyhedral oligomeric silsesquioxane (POSS) nanoparticles.

In one embodiment, a polymer blend of an anion exchange ionomer with one or more charged or uncharged polymers is employed in any of the cation exchange layer 110, the 3D bipolar junction 120 and the anion exchange layer 130.

In one embodiment, a polymer blend of a cation exchange ionomer with one or more charged or uncharged polymers is employed in any of the cation exchange layer 110, the 3D bipolar junction 120 and the anion exchange layer 130.

In one embodiment, at least one of the cation exchange layer 110, the 3D bipolar junction 120 and the anion exchange layer 130 is further reinforced with polymer fibers being made of an ion-exchange or uncharged polymer including poly(phenyl sulfone) or poly(phenylene oxide), poly(vinylidene fluoride).

In one embodiment, the 3D bipolar junction 120 includes catalyst particles.

In one embodiment, the catalyst particles include inorganic and organic particles, or polymers.

In one embodiment, the catalyst particles include poly(vinyl pyridine), poly(ethylene imine), poly(vinyl alcohol), poly(acrylic acid), silica, functionalized silica, $Al(OH)_3$, $Fe(OH)_3$, $Fe_2O_3$, $Ca(OH)_2$, $Mg(OH)_2$, $FeCl_3$, $RuCl_3$, $Cr(NO_3)_3$, $ZrO_2$, sodium metasilicate, graphene oxide and polymers or particles with phosphoric or phosphonic acid groups.

In one embodiment, the internal 3D bipolar interface 120 is a junction layer of interpenetrating polymer nano- or micro-fibers of anion-exchange polymer and cation-exchange polymer, with or without catalyst particles.

In one embodiment, the interpenetrating polymer fiber junction layer 120 has no void space between the fibers.

In certain aspects, the invention relates to a fuel cell and/or a electrochemical device, each of which comprises at least one bipolar membrane as disclosed above.

In another aspect, the invention relates to a method of fabricating a bipolar membrane. In one embodiment, the method includes the following steps: (a) forming a cation exchange layer of one or more cation exchange polymers, a 3D bipolar junction layer of a mixture of at least one cation exchange polymer and at least one anion exchange polymer, and an anion exchange layer one or more anion exchange polymers, where the second layer is disposed between the first layer and the third layer, thereby defining a bipolar membrane structure; (b) exposing the bipolar membrane structure to dimethlformamide (DMF) vapor, DMAc vapor or alcohol vapor; and (c) hot-pressing the exposed bipolar membrane structure to fabricate the bipolar membrane. The bipolar membrane has an internal 3D bipolar interface with an interfacial area construed of the at least one cation exchange polymer and the at least one anion exchange polymer. The at least one cation exchange polymer in the 3D bipolar junction layer is connected to the one or more cation exchange polymers of the cation exchange layer, and the at least one anion exchange polymer in the 3D bipolar junction layer is connected to the one or more anion exchange polymers of the anion exchange layer.

In one embodiment, the cation and anion exchange layers are formed by solution casting of dense films or impregnation of reinforcing mats with cation-exchange and anion-exchange polymer solutions, respectively.

In one embodiment, the forming step comprises electrospinning a first solution containing the one or more cation exchange polymers to form the cation exchange layer; concurrent co-electrospinning the first solution and a second solution containing one or more anion exchange polymers directly onto the cation exchange layer to form the 3D bipolar junction layer; and electrospinning the second solution directly onto the 3D bipolar junction layer to form anion exchange layer.

Those skilled in the art will recognize that the electrospinning process typically involves applying a high voltage electric field to a spinneret needle containing a polymer solution or polymer melt. Mutual charge repulsion on the surface of the solution overcomes the surface tension such as to produce and eject a thin liquid jet of the solution from the tip of the spinneret needle. As the jet of electrified solution travels towards a collector with a different electric potential, electrostatic repulsion from surface charges causes the diameter of the jet to narrow.

The jet may enter a whipping mode and thereby be stretched and further narrowed due to instabilities in the electric field. Solid fibers are produced as the jet dries and the fibers accumulate on the collector to form a non-woven material.

Electrospinning has been used previously for the fabrication of nanofiber composite ion-conducting cation and anion exchange membranes with unique and attractive characteristics for electrochemical devices and processes. For example, nanofiber composite Nafion/polyphenylsulfone membranes were shown to be more durable than commercial Nafion in a hydrogen/air fuel cell [2]. Similarly, nanofiber composite membranes composed of Nafion nanofibers surrounded by PVDF (polyvinylidene fluoride, or polyvinylidene difluoride) showed excellent performance in $H_2/Br_2$ regenerative fuel cells, due to low bromine species crossover [3]. Recently developed electro spun composite anion-exchange membranes exhibited moderate water swelling, excellent mechanical strength, and high hydroxide ion conductivity, e.g., 0.065 S/cm at room temperature and 0.102 S/cm at 60° C. [4].

In one embodiment, the 3D junction is formed by concurrent dual-fiber electrospinning of an anion-exchange polymer such as quaternized poly(phenylene oxide) (QPPO) and a cation-exchange polymer, such as sulfonated poly (etherether ketone) (SPEEK) into an interpenetrating nano- or micro-fiber network, which after densification, gives a very high interfacial area 3D nonporous bipolar junction between films (layers) of neat QPPO and SPEEK.

In one embodiment, the method further comprises depositing catalyst particles into the 3D bipolar junction layer, by electrospinning, electrospraying, airbrushing, or piezoelectric spraying.

In one embodiment, the forming step comprises electrospinning a first solution containing the one or more cation exchange polymers to form the cation exchange layer; co-electrospinning the first solution and a second solution containing one or more anion exchange polymers to form the 3D bipolar junction layer while continuously electrospraying an aqueous suspension of catalyst particles; electrospinning the second solution to form the anion exchange layer; and stacking the 3D bipolar junction layer on the cation exchange layer and the anion exchange layer on the 3D bipolar junction layer to define the bipolar membrane structure.

In yet another aspect, the invention relates to a method of fabricating a bipolar membrane. In one embodiment, the method comprises electrospinning electrospinning a first solution containing the one or more cation exchange polymers to form a cation exchange mat; electrospraying an aqueous suspension of catalyst particles on the cation exchange mat; electrospining a second solution containing one or more anion exchange polymers on the electrosprayed catalyst particles to form a two-layer mat; and processing the two-layer mat by exposing to DMAc, DMF or alcohol vapor followed by hot pressing.

In one embodiment, the one or more cation exchange polymers comprise at least one of polymers containing protogenic groups including sulfonic, sulfonimide, phosphonic and carboxylic, and their derivatives.

In one embodiment, the one or more cation exchange polymers comprise at least one of poly(arylene ether sulfonic acid), poly(phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers, poly(vinylphosphonic acid), poly(acrylic acid), poly(methacrylic acid) and their copolymers, carboxyphenoxymethylpolysulfone, and their derivatives.

In one embodiment, the perfluorosulfonic acid polymers comprises Nafion®, Aquivion®, or their derivatives.

In one embodiment, the one or more cation exchange polymers of the cation exchange layer comprises sulfonated poly(ether ether ketone) (SPEEK).

In one embodiment, the one or more anion exchange polymers comprise at least one of polymers containing positive fixed charge groups including quaternary ammonium, guanidinium, phosphonium, and their derivatives).

In one embodiment, the one or more anion exchange polymers comprise at least one of polymers based on polyarylene or on aliphatic hydrocarbon backbone.

In one embodiment, the one or more anion exchange polymers comprise quaternized poly(phenylene oxide) (QPPO).

In one embodiment, the catalyst particles comprise inorganic and organic particles, or polymers.

In one embodiment, the catalyst particles comprise poly (vinyl pyridine), poly(ethylene imine), poly(vinyl alcohol), poly(acrylic acid), silica, functionalized silica, $Al(OH)_3$, $Fe(OH)_3$, $Fe_2O_3$, $Ca(OH)_2$, $Mg(OH)_2$, $FeCl_3$, $RuCl_3$, $Cr(NO_3)_3$, $ZrO_2$, sodium metasilicate, graphene oxide and polymers or particles with phosphoric or phosphonic acid groups.

Other embodiments and modifications of the invention can also be implemented as follows.

The cation-exchange polymer can be any one of a number of polymers containing protogenic groups (e.g. sulfonic, sulfonimide, phosphonic and carboxylic). Examples of such materials include poly(arylene ether sulfonic acid), poly (phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers (like Nafion, Aquivion and similar), and also poly(vinylphosphonic acid), poly(acrylic acid), poly(methacrylic acid) and their copolymers, and carboxyphenoxymethylpolysulfone.

The anion-exchange polymer can be any of a number of polymers containing positive fixed charge groups (e.g. quaternary ammonium, guanidinium or phosphonium). The polymers can be based on polyarylene or on aliphatic hydrocarbon backbone.

The outer ion-exchange layers and the bipolar junction layer of the bipolar membrane can be additionally reinforced with polymer fibers, which can be made of an ion-exchange or uncharged polymer (like poly(phenyl sulfone) or poly (phenylene oxide), poly(vinylidene fluoride). Multi-fiber electrospinning can be conveniently employed to prepare such reinforced layers.

The BPM can have a bipolar junction including the cation and anion exchange polymers with or without catalyst particles, where the later may be useful as membranes for self-humidifying fuel cells. Inorganic and organic particles or polymers can be used in the catalyzed junction. For example, poly(vinyl pyridine), poly(ethylene imine), poly (vinyl alcohol), poly(acrylic acid), silica, functionalized silica, $Fe(OH)_3$, $Fe_2O_3$, $Ca(OH)_2$, $Mg(OH)_2$, $FeCl_3$, $RuCl_3$, $Cr(NO_3)_3$, $ZrO_2$, sodium metasilicate, graphene oxide and polymers or particles with phosphoric or phosphonic acid groups. The deposition of the catalyst can be accomplished by electrospinning, electrospraying, airbrushing or piezoelectric spraying. The catalyst can be deposited continuously and concurrently with the fiber electrospinning or it can be applied as a single or multiple layers.

The outer layer can include mixtures two or more cation exchange polymers or two or more anion exchange polymers. The combination of same charge polymers can improve conductivity/permselectivity balance as well as the mechanical strength of the outside layers through the control of the overall water/salt uptake. The outer layers of the bipolar membrane can include neat cation exchange ionomer or anion exchange ionomer with inert/uncharged particles. The particles can improve mechanical strength and/or increase ionic conductivity.

Example particles of the first type could be graphene, graphene oxide, carbon nanotubes, short polymer fibers, and sulfonated or aminated polyhedral oligomeric silsesquioxane (POSS) nanoparticles can serve as example of the second particle type.

The outer layers of the bipolar membrane can be made by solution casting of dense films or the impregnation of reinforcing mats with the appropriate cation-exchange and anion-exchange polymer solutions, followed by solvent evaporation and hot pressing onto the 3D nano- or microfiber junction layer.

A polymer blend of an anion-exchange ionomer with one or more charged or uncharged polymers can be employed in any of the layers of the bipolar membrane. Similarly, a polymer blend of a cation-exchange ionomer with one or more charged or uncharged polymers can be used in the outer layer and/or the bipolar junction region.

Polymer fibers can be made using an electrospinning process or processes that do not use an electric field, including gas jet fiber processing and centrifugal fiber spinning.

One skilled in the art will realize that there can be further modifications to embodiments listed above for a bipolar membrane with a 3D junction.

Without intent to limit the scope of the invention, examples and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Experimental and Results

The electrospinning solutions were prepared from sulfonated poly(etherether ketone) (SPEEK) and tetramethyl ammonium poly(phenylene oxide) (QPPO), starting with a brominated poly(phenylene oxide) (PPO), which was quaternized by trimethylamine. The relevant ion-exchange capacity (IEC), conductivity, and water uptake properties of solution-cast films from the two polymers are listed in Table 1. The mismatch of conductivity and water swelling for the two polymers was not dramatically high and did not cause any problems during membrane fabrication and testing.

TABLE 1

Ion conductivity and IEC of the two ion-exchange polymers used in the exemplary embodiments of the disclosure. The testing was performed with solution cast films.

| Polymer | IEC (mequiv/g) | Conductivity (S/cm$^2$) | Gravimetric Swelling in Water | Gravimetric Swelling in 0.5MNaSO$_4$ |
|---|---|---|---|---|
| SPEEK (H$^+$-form) | 1.8-2.0 | 0.043-0.046 (proton conductivity in water at room temperature) | 33% | 40% |
| QPPO (OH$^-$-form) | 1.9-2.0 | 0.022-0.024 (hydroxide ion conductivity in water at room temperature) | 54% | 61% |

For the preliminary experiments, two sets of BPMs were prepared. Conventional membranes were prepared by solution casting on a glass plate the two separate SPEEK and QPPO films and then pressing them together at room temperature using a hydraulic press.

Figure 2:
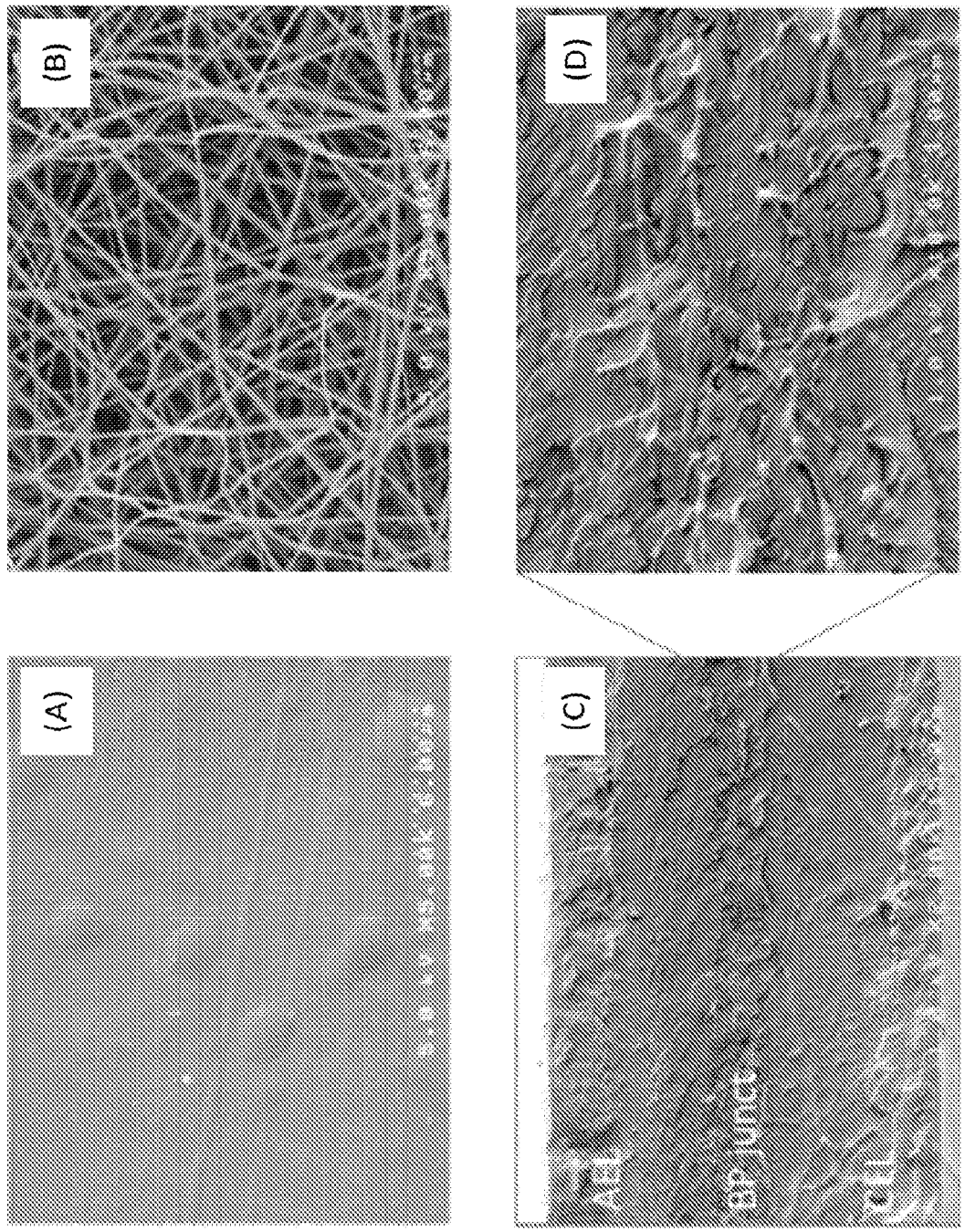
FIG. 2 shows SEM micrographs of the electrospun SPEEK surface layer (A) before densification (hot-pressing) and (B) after densification (hot-pressing), and SEM micrographs of the final BPM cross-section: (C) the entire cross-section and (D) the magnified junction region, according to one embodiment of the invention.

However, the 3D junction membranes according one embodiment of the invention were fabricated using a sequence of four steps: (1) electrospinning of a cation-exchange mat, (2) concurrent co-electrospinning of cation-exchange and anion-exchange polymer mixture onto the cation-exchange mat, (3) electrospinning of anion-exchange polymer directly onto the mixed cation-exchange/anion-exchange layer, and (4) densification of the entire three-layer mat by exposure to either dimethlformamide (DMF) or alcohol (e.g. methanol or ethanol) vapor (which caused the fibers to soften and flow) followed by hot-pressing (which resulted in complete pore closure). Henceforth, this method of trilayer nano- or micro-fiber composite BPM fabrication is identified as "Protocol #1". The conditions for concurrent electrospinning of the 3D junction layer are given in Table 2. SEM micrographs of the electro spun SPEEK surface layer before the densification and after the densification (hot-pressing) are shown in FIGS. 2(A) and 2(B), respectively, while SEM micrographs of the entire cross-section of the BPM and of the magnified junction region of the BPM are FIGS. 2(C) and 2(D), respectively, where a 6 μm thick junction layer is clearly distinguished. The Protocol #1 trilayer membrane can also be made by (1) solution casting separate outer layers of cation-exchange and anion-exchange polymers, (2) concurrent co-electrospinning of cation-exchange and anion-exchange polymer mixture (with or without the addition of catalyst particles) for the junction layer, and (3) pressing together the three separate layers with fiber mat densification.

TABLE 2

Electrospinning conditions used for the fabrication of the bipolar junction.

| Polymer | Spinning Solution | Needle-Collector Distance (cm) | Relative Humidity (%) | Flow Rate (ml/h) | Applied Voltage (kV) |
|---|---|---|---|---|---|
| SPEEK | 20 wt % in DMAc | 7.5 | 50 | 0.20 | 12 |

TABLE 2-continued

Electrospinning conditions used for the fabrication of the bipolar junction.

| Polymer | Spinning Solution | Needle-Collector Distance (cm) | Relative Humidity (%) | Flow Rate (ml/h) | Applied Voltage (kV) |
|---|---|---|---|---|---|
| QPPO | 23 wt % in 80:20 DMF-THF | 8.0 | 50 | 0.15 | 14 |

The predicted weight ratio of SPEEK to QPPO in the 3D junction layer was close to about 1:1. Two bipolar membranes were fabricated with different thickness of the junction (about 3 μm and about 6 μm), as determined by SEM analysis of the membrane cross-sections. SEM and membrane density analyses confirmed complete mat densification via DMAc, DMF or alcohol vapor exposure and hot-pressing. There were no defect pores in the outer layers, with well-defined dual-polymer composite junction between the SPEEK and QPPO layers.

Characterization of Bipolar Membranes without Catalyst at the 3D Junction Three BPMs were selected for initial electrochemical characterization experiments: a 2D (planar) junction BPM made by solution casting and pressing two films composed of SPEEK and QPPO layers, and two electrospun BPMs with 3D junctions according to embodiments of the invention: Membrane A with a 12 μm layer of SPEEK, a 12 μm layer of QPPO and a 3 μm thick junction, and Membrane B with a 12 μm layer of SPEEK, a 12 μm layer of QPPO, and a 6 μm thick junction.

Figure 3:
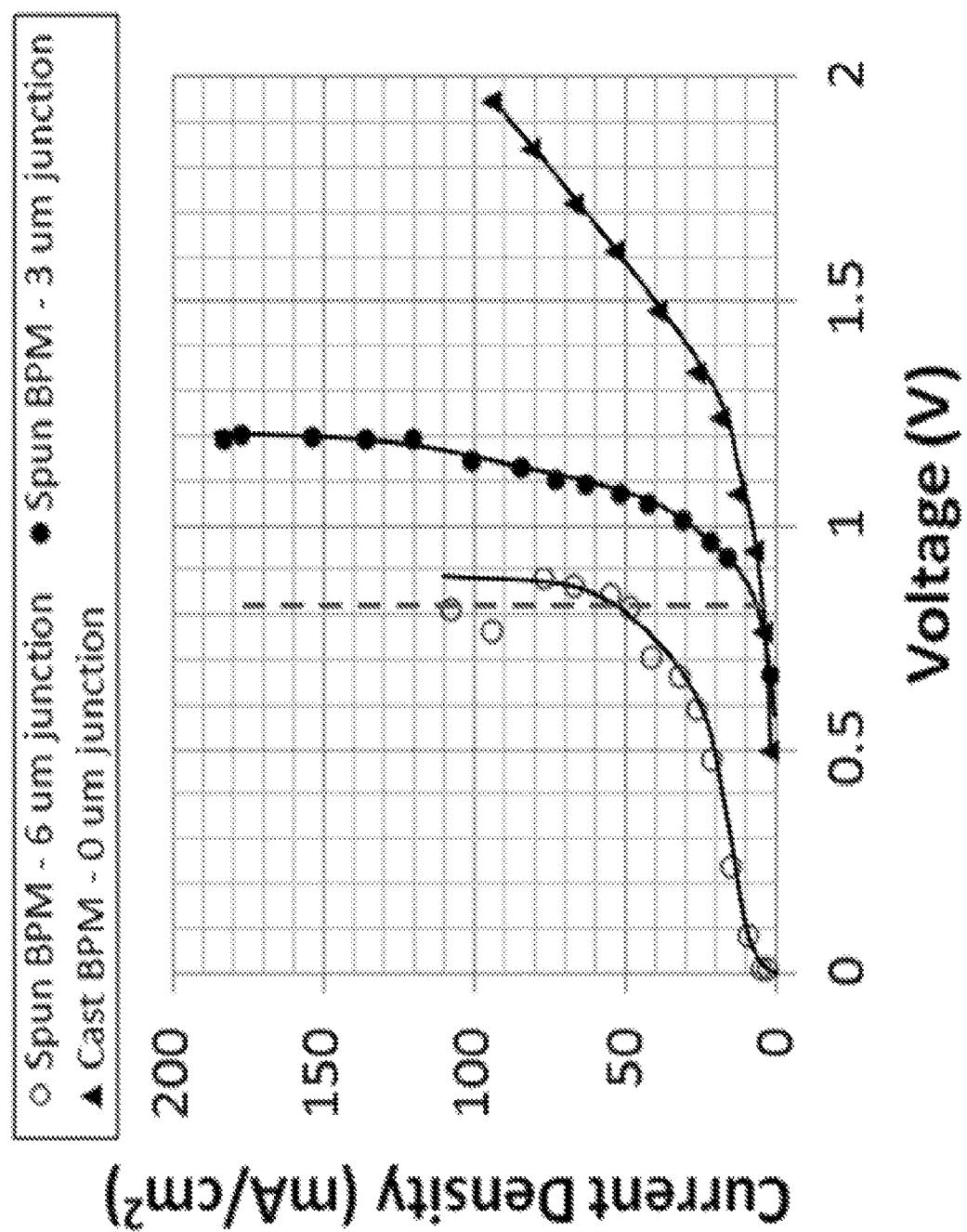
FIG. 3 shows current-voltage curves obtained for the two electrospun BPMs and the solution-cast BPM according to embodiments of the invention. The broken line marks the theoretical water dissociation potential of 0.828 V at about 25° C. Experiments were carried out in a $0.5MNa_2SO_4$/BPM/$0.5MNa_2SO_4$ cell at about 25° C.

The electrochemical BPM characterization was performed at room temperature in a two-compartment cell, equipped with Ag/AgCl reference electrodes inside Luggin capillaries and with working Pt/Ir flag electrodes, where the compartments were filled with a 0.5MNa$_2$SO$_4$ solution. That is, experiments were carried out in a 0.5MNa$_2$SO$_4$/BPM/0.5MNa$_2$SO$_4$ cell at about 25° C. The resultant current-voltage curves for the two electrospun BPMs and the solution-cast BPM at about 25° C. are shown in FIG. 3, where the broken line marks the theoretical water dissociation potential of 0.828 V at 25° C. Up to about 200 mA/cm$^2$, no limiting current was obtained for any of the three bipolar membranes, indicating sufficient water transport rates to replenish that water which is split into H$^+$ and OH$^-$ at the junction. For Membrane B with a 6 μm thick 3D junction, significant current was generated near the thermodynamic voltage for water splitting, i.e., a current density of about 100 mA/cm$^2$ of $E_{100}$=1.2 V, but significant co-ion leakage was also observed with $I_{lim1}$=25 mA/cm$^2$. This was the consequence of the relatively low thickness of the external ion-exchange layers (SPEEK and QPPO were each with a 12 μm thickness), in particular the more swollen QPPO layer. The solution-cast membrane with a planar 2D junction exhibited a relatively high ionic resistance (the slope of the I-V curve was not large), with a high membrane voltage drop of 2.0 V at 100 mA/cm$^2$, presumably due to imperfect bipolar junction/bonding of the two polymer layers and the greater thicknesses of the SPEEK and QPPO layers (50 μm each). For Membrane A with a 3 μm thick 3D junction, the electrospun bipolar membrane appeared to have the best overall characteristics, combining a very small lower limiting current ($I_{lim1}$=3 mA/cm$^2$) and relatively low splitting voltage ($E_{100}$=1.2 V and an extrapolated voltage of 0.90 V at zero current density), indicating a reasonable balance of the 3D junction thickness and the overall membrane thickness with low interfacial resistance within the junction.

The results shown in FIG. 3 confirm the benefits of the 3D bipolar junction. By expanding the interfacial bipolar junction area/region between the anion and cation exchange layers, the actual/local current density (reaction rate) for water splitting is lowered which prevents unwanted dehydration in the junction with the resultant loss of membrane conductivity. This is especially important at high operating current densities.

Another advantage of the morphology of the BPMs according to embodiments of the invention is an improved resistance to delamination due to interlocking of the interpenetrating networks of cationic and anionic fibers. It is also important to note that during the concurrent electrospinning of anion and cation exchange polymers for the 3D junction region, the SPEEK and QPPO fibers intermix in essentially the dry state (due to rapid solvent evaporation between the spinneret tip and fiber collector surface), thus avoiding/preventing anion-cation fixed-charge site neutralization and the resultant increase in interfacial resistance that can occur at the BPM junction during a sequential film wet casting fabrication procedure.

Figure 4:
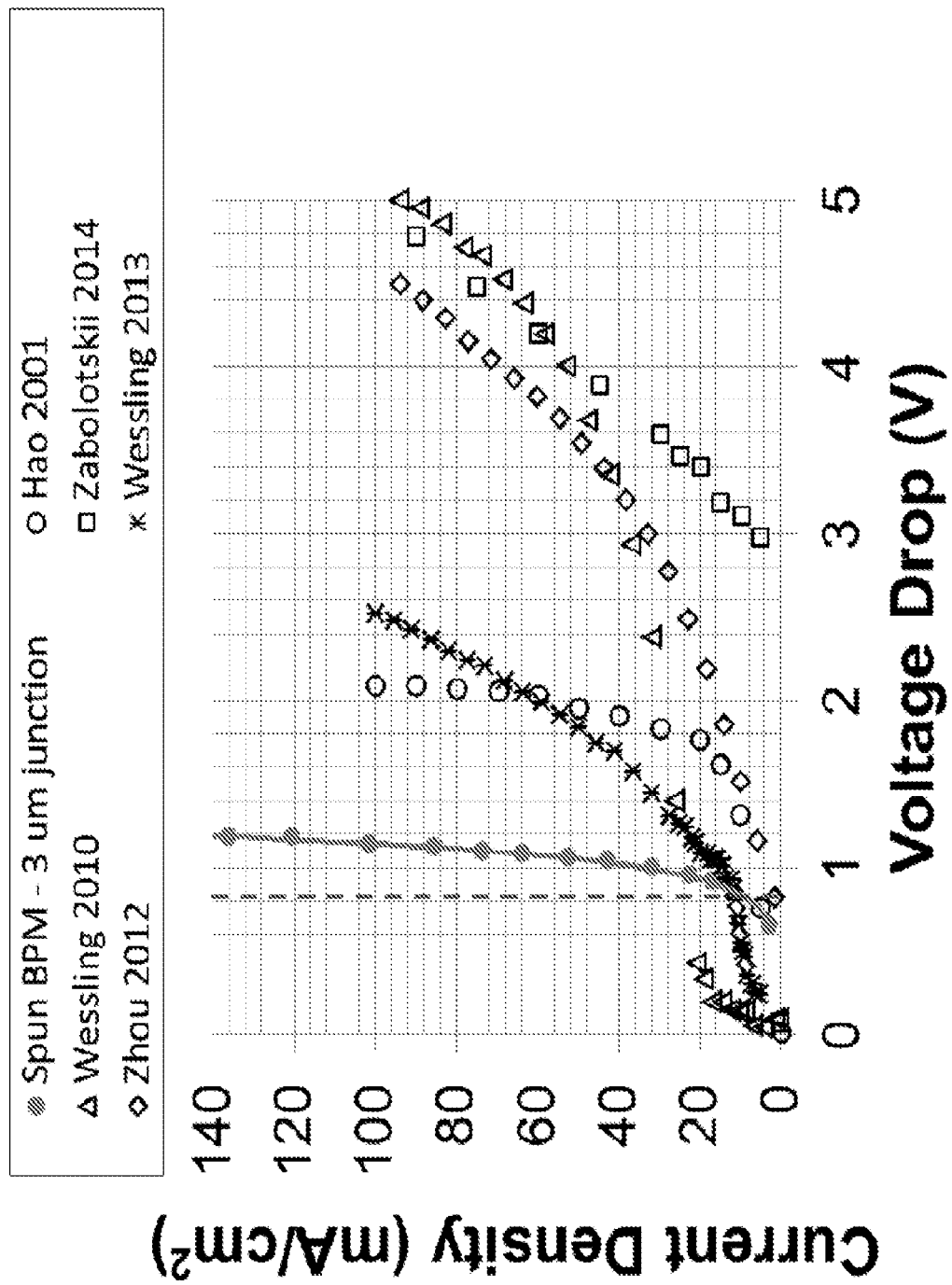
FIG. 4 shows current-voltage curves adapted from the recent publications along with the electrospun 3 μm junction BPM (solid circles, where the data were collected in a $0.5MNa_2SO_4$/BPM/$0.5MNa_2SO_4$ cell at about 25° C.) according to embodiments of the invention. The broken line marks the theoretical water dissociation potential of 0.83 V at about 25° C.

FIG. 4 shows current-voltage curves adapted from the recent publications along with the electrospun 3 μm thick 3D junction BPM (solid circles, where the data were collected in a 0.5MNa$_2$SO$_4$/BPM/0.5MNa$_2$SO$_4$ cell at about 25° C.) according to one embodiment of the present invention. The broken line marks the theoretical water dissociation potential of 0.83 V at 25° C. As shown in FIG. 4, the I-V polarization behavior of the electrospun 3D junction bipolar membrane (with a 3 μm thick 3D junction) is contrasted with five PBM membranes in the literature with 2D junctions. None of the published data matches the performance of the 3D junction electrospun membrane according to one embodiment of the present invention. Either strong co-ion leakage (high currents at low voltages) or high membrane resistance (low currents at high voltage) plague all of these films. It is important to note that the junction region in the 3D nanofiber membrane contained no catalyst to promote water splitting, whereas many of the other films in FIG. 4 had some kind of catalytic material/sublayer at the 2D junction, e.g., cationic resin microparticles in the membrane from Hao [5], polyethyleneimine in Wessling's LbL membrane [1], copper phthalocyanine nanofibers from Zhou [6] and polyvinylpiridine in Wessling [7]. As shown in the following section, significant performance improvement is observed in 3D junction nanofiber PBMs if a catalyst material is added to one or both of the cospun nanofibers which make up the junction.

Characterization of Bipolar Membranes with a Catalyst at the Junction

In the exemplary experiments, nanofiber-based bipolar membranes were made with catalytic particles at the bipolar 3D junction according to embodiments of the invention. Commercial BPMs are known to contain catalyst within the junction layer (e.g., FumaTechFBM membranes supposedly have a poly(acrylic acid/poly(vinylpyridine) salt complex at the junction). In certain embodiments, aluminum hydroxide was selected as the catalyst to be incorporated into the bipolar 3D junction. The good catalytic action of insoluble hydroxides of chromium and iron can also be utilized to practice the invention. In addition, other multivalent metal compounds and amines were also used as the catalysts.

In certain aspects of the invention, a method for integral bipolar membrane fabrication with Al(OH)$_3$ nanoparticles, which is referred to "Protocol #2" hereinafter, is as follows:

(1) electrospinning SPEEK fibers (e.g., about 100 μm layer), (2) co-electrospinning a dual fiber layer from SPEEK and QPPO fibers while continuously electrospraying an Al(OH)$_3$ aqueous suspension (e.g., about 10 nm particles in water with a few drops of Triton X-100 non-ionic surfactant, where the particle concentration was about 0.5-1.0% in water), (3) electrospinning QPPO fibers (e.g., about 75 μm layer), (4) exposing the mat to DMAc, DMF or alcohol vapor for about 55-30 min, and (5) hot-pressing the mat for about 10 min at about 120° C. and about 15000 lb force. The final bipolar membrane thickness was about 50 μm. BPMs from hot-pressed stacks of the separately electrospun layers (1), (2), and (3) were also fabricated for reference. Please note that Protocol #1 involves the separate electrospinning of the three layers of a BPM, followed by hot pressing and vapor exposure, as discussed above. As a modification of Protocol #1, henceforth denoted as "Protocol #1A", the Al(OH)$_3$ particles were added to the separately electrospun junction layer and then the three separate electrospun fiber mats were hot pressed to form a bipolar membrane.

Figure 7:
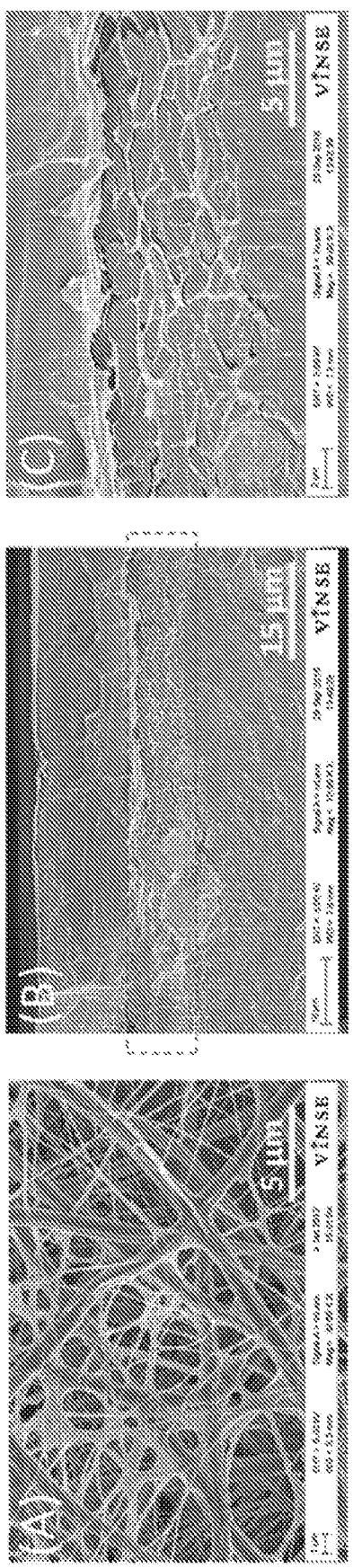
FIG. 7 shows scanning electron micrographs of the dual fiber junction and cross-sections of a bipolar membrane with a 3D junction with $Al(OH)_3$ catalyst particles in the junction region according to embodiments of the invention: (A) top-down view of dual fibers in the junction region with $Al(OH)_3$ nanoparticles (before densification), (B) freeze-fractured cross section of the entire densified membrane with the junction region framed and (C) a magnified view of the framed 3D junction region in (B).

In certain aspects of the invention, another method for integral bipolar membrane fabrication, which is referred to "Protocol #3" hereinafter, includes: (1) electrospinning SPEEK fibers (e.g., about 100 μm layer), (2) electrospraying an aqueous suspension of Al(OH)$_3$ particles, (3) electrospinning a QPPO fiber layer, (4) processing the two-layer mat by exposing to DMAc, DMF or alcohol vapor followed by hot pressing. Experimental data from three duplicate nanofiber bipolar membranes made by this Protocol #3 are shown in FIG. 7.

Figure 5:
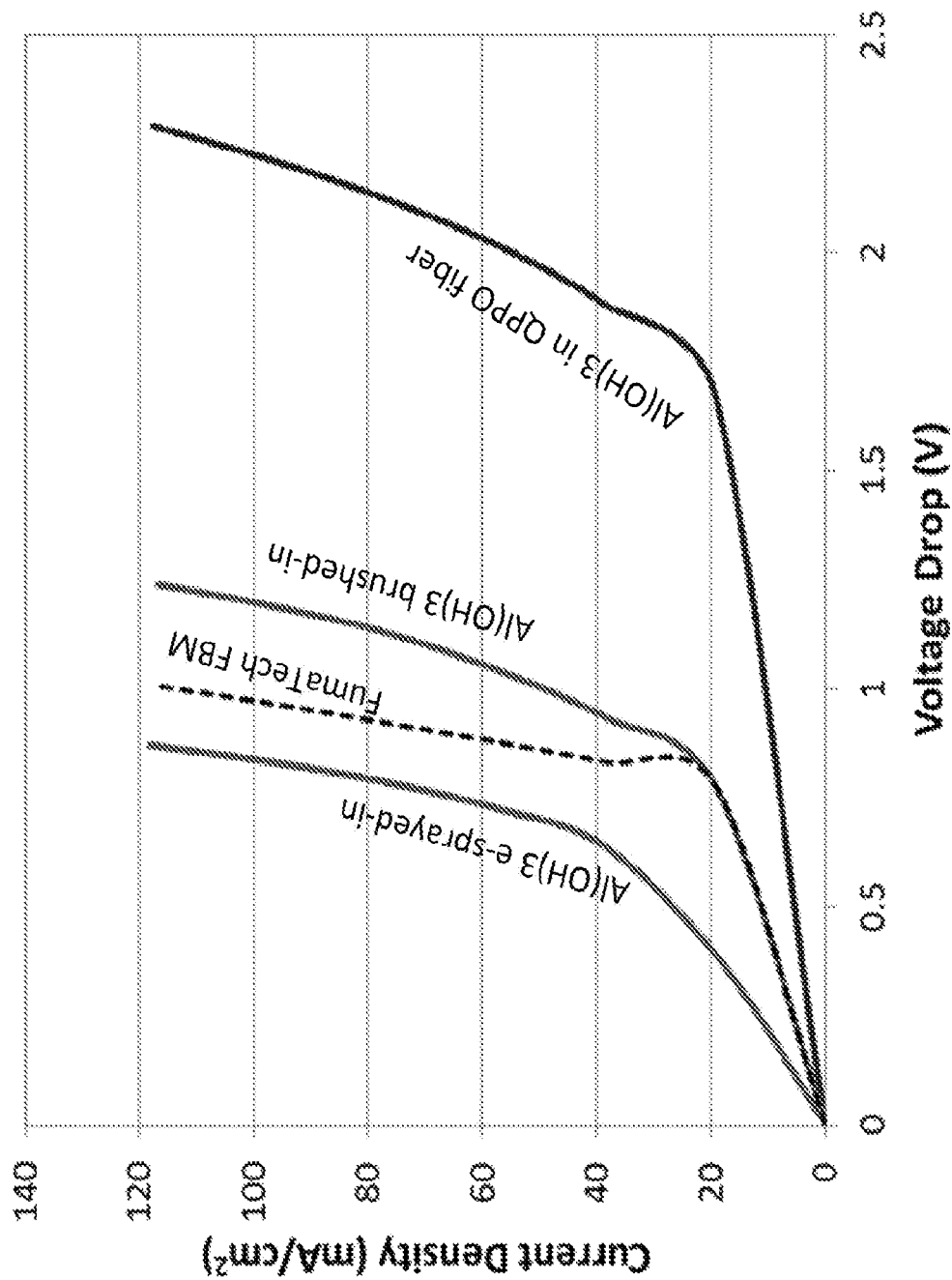
FIG. 5 shows the performance of three nanofiber-based bipolar membranes where the membranes were made by separately electrospinning the cation exchange, anion exchange and bipolar junction layers, followed by hot pressing the three layers into a single film (Protocol #1a), according to embodiments of the invention. Three different methods of adding catalytic $Al(OH)_3$ particles to the junction layer are contrasted in this figure. Experiments were carried out in a $0.5MNa_2SO_4$/BPM/$0.5MNa_2SO_4$ cell at about 25° C.

For bipolar membranes made from three separately electrospun layers, different method of adding Al(OH)$_3$ particles were investigated: (A) putting particles in the QPPO fibers prior to electrospinning the junction region, (B) brushing a solution of particles while electrospinning the junction layer, and (C) electrospraying a particle solution while electrospinning the junction layer. FIG. 5 shows the performance of three nanofiber-based bipolar membranes where the bipolar membranes were made by separately electrospinning the cation exchange, anion exchange and bipolar junction layers, followed by hot pressing the three layers into a single film (Protocol #1A). Experiments were carried out in a 0.5MNa$_2$SO$_4$/BPM/0.5MNa$_2$SO$_4$ cell at about 25° C. These bipolar membranes formed by three different methods of adding catalytic Al(OH)$_3$ particles to the junction layer have very different the performance, compared to the performance of a commercial BPM from FumaTech. As shown in FIG. 5, the three layer film with electrosprayed Al(OH)$_3$ particles performed best, better than the commercial film, i.e., the water splitting voltage for the nanofiber-based membrane was lower than that for the FumaTech BPM.

Figure 6:
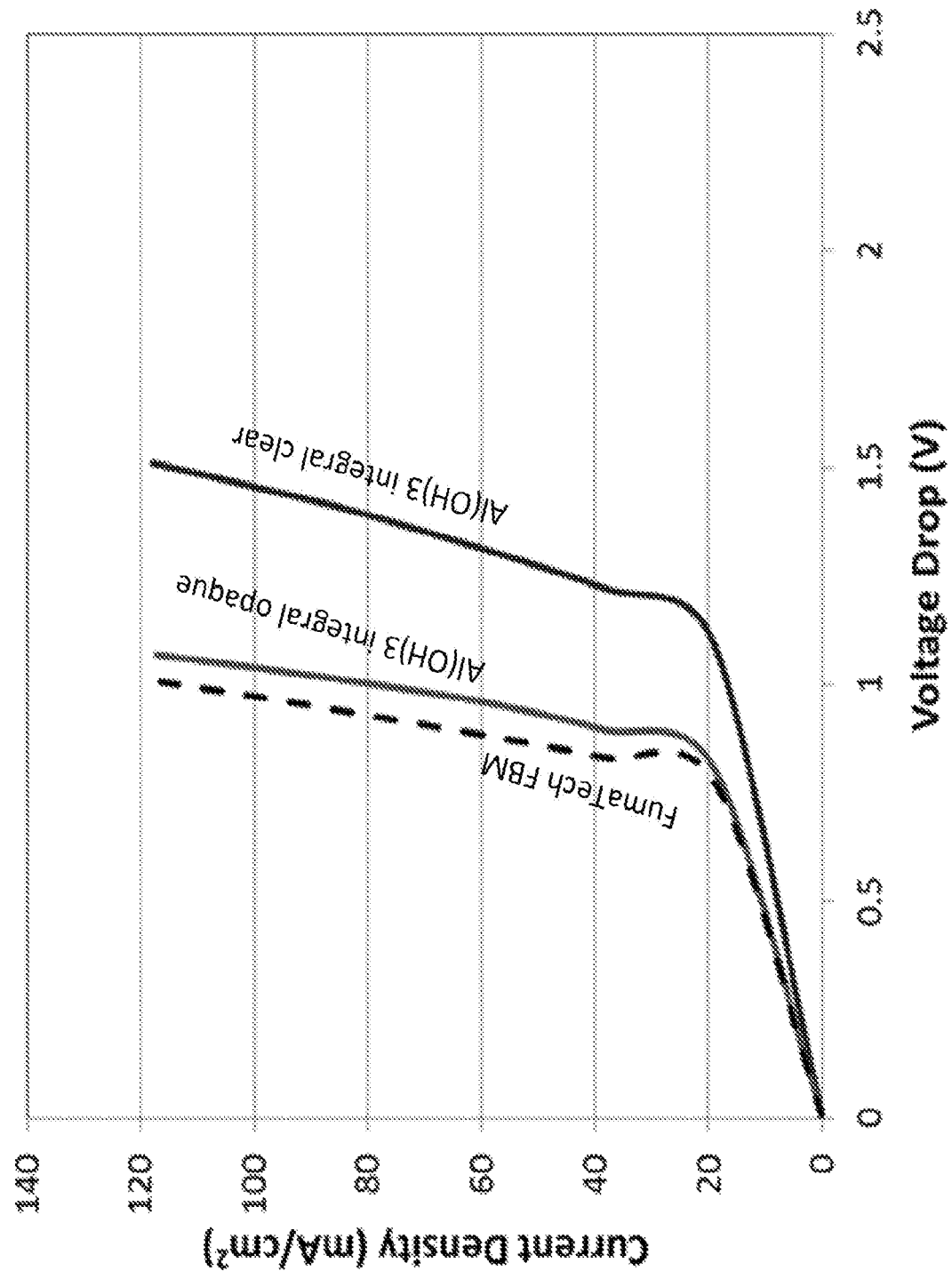
FIG. 6 shows the performance of integral three-layer integral electrospun bipolar membranes with different hot pressing conditions using Protocol #2, according to embodiments of the invention. Experiments were carried out in a $0.5MNa_2SO_4$/BPM/$0.5MNa_2SO_4$ cell at about 25° C.

In certain embodiments, integral electrospun 3D junction BPMs with catalysts were fabricated and evaluated. Here the three layers of the bipolar membrane were electrospun sequentially followed by fiber mat processing to melt the fibers and remove defect voids. Catalytic Al(OH)$_3$ particles were added to the junction region by electrospraying a particle solution simultaneously while co-electrospinning SPPK and QPPO. FIG. 6 shows the performance of integral three-layer integral electrospun bipolar membranes with different hot pressing conditions using Protocol #2. Experiments were carried out in a 0.5MNa$_2$SO$_4$/BPM/0.5MNa$_2$SO$_4$ cell at about 25° C. As shown in FIG. 6, the performances of two integral nanofiber-based BPMs are substantially different from that of the commercial FumaTech BPM, where different hot pressing conditions were used to processes the three-layer fiber mat. Mild hot pressing produced an opaque film, while more sever hot pressing resulted in a clear, transparent film. As shown in FIG. 6, the opaque three-layer film with catalyst particles worked best, with a water splitting performance nearly the same as that for the commercial FumaTech bipolar membrane.

Figure 8:
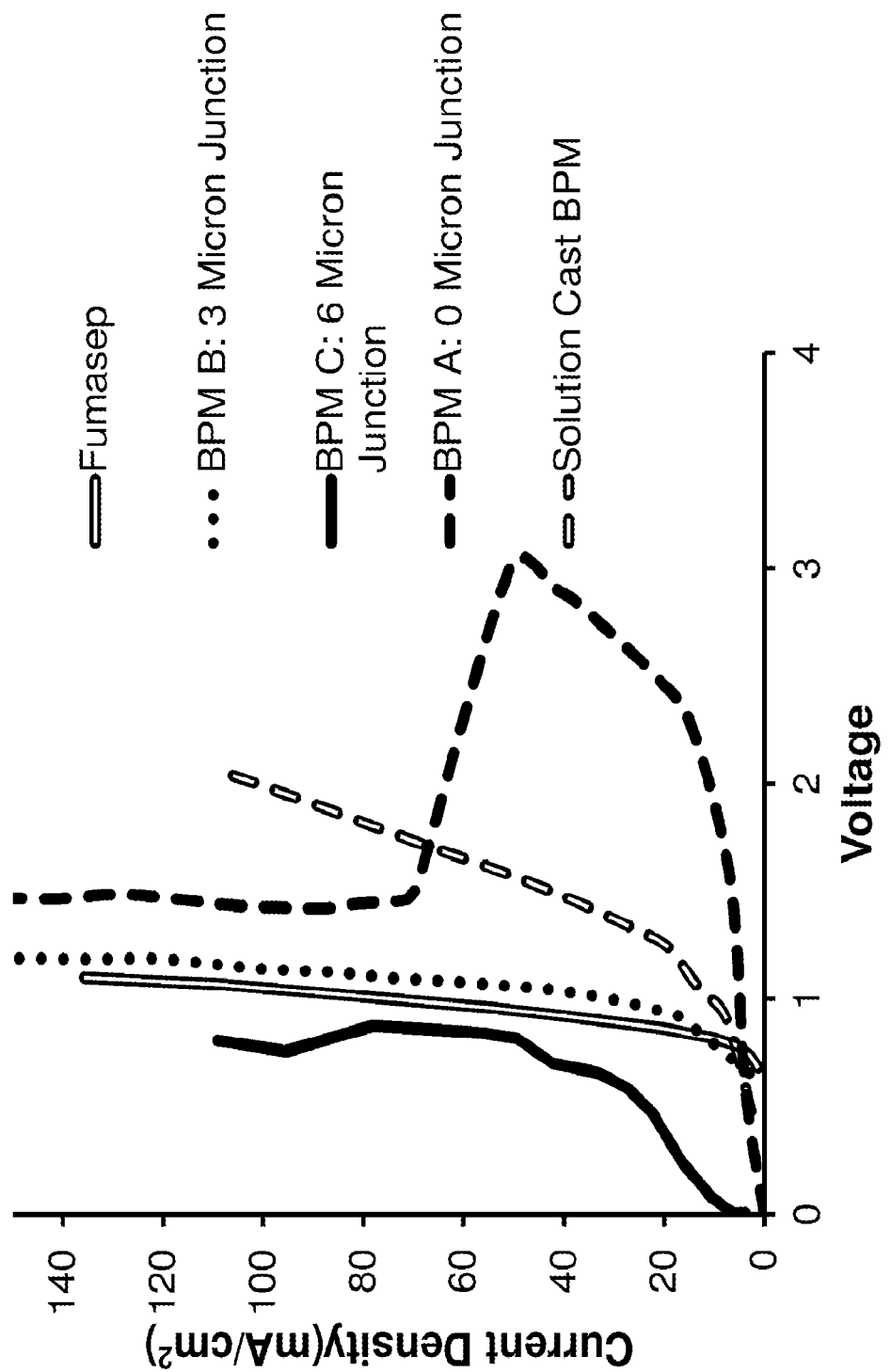
FIG. 8 shows the performance of uncatalyzed nanofiber-based bipolar membrane with variation of junction thickness and morphology, according to embodiments of the invention. BPMs A, B and C were obtained via electrospinning. Solution cast membrane was obtained by separately solution casting anion-echange and cation-exchange polymer films and then hotpressing them together. A commercial Fumasep membrane characteristic is also shown.
Figure 9:
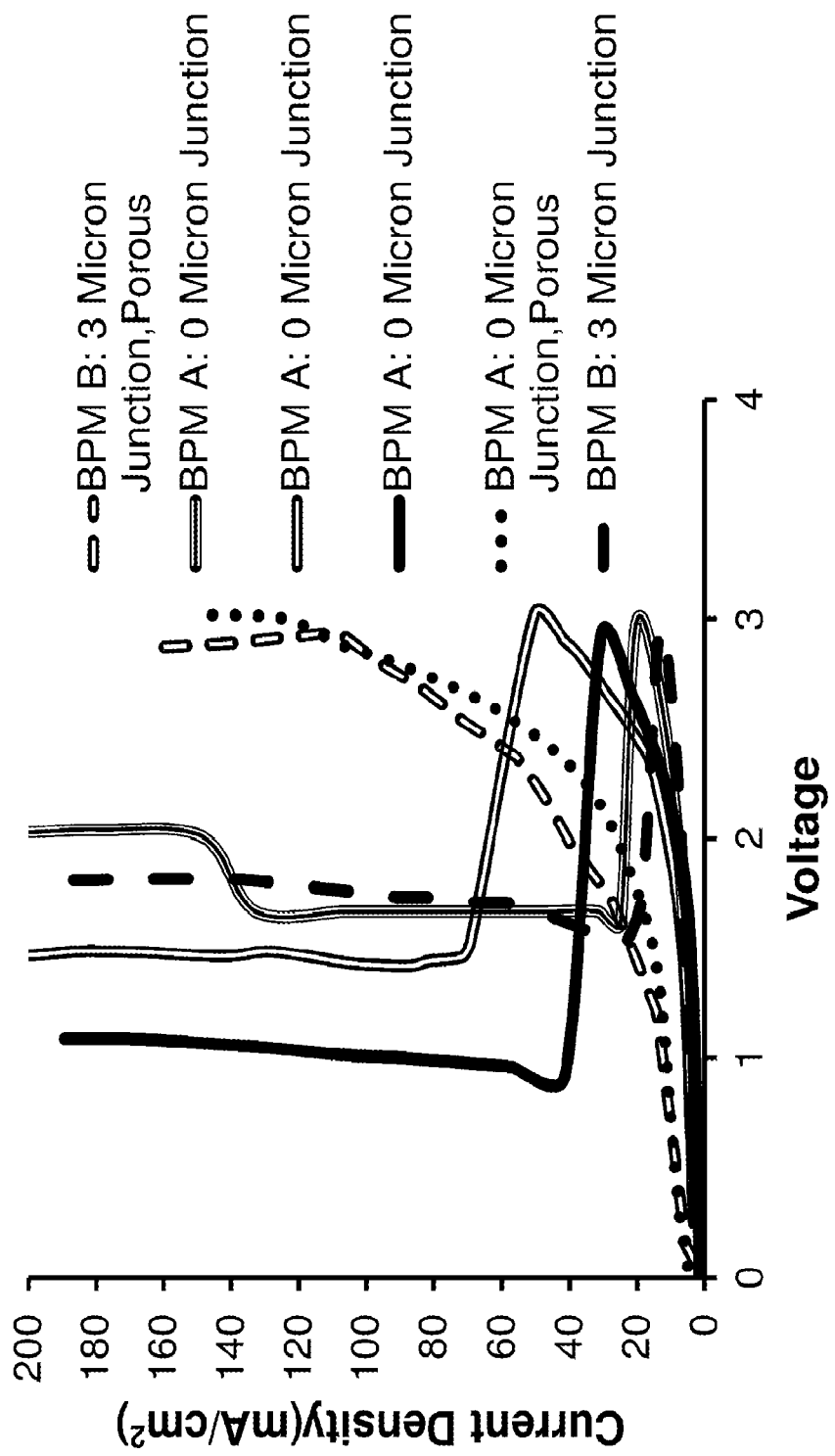
FIG. 9 shows "self-repair" effect and the performance of nanofiber-based bipolar membrane with variation of junction thickness and morphology, according to embodiments of the invention. The membranes with incompletely eliminated voids (marked "porous") show significant resistive losses, while the remaining membranes show "self-repair" effect, whereby the initial high voltage drop is reduced significantly after a certain critical voltage drop is reached.

In FIGS. 8 and 9, an interesting "self-repair" effect is demonstrated, whereby the initial high voltage drop is reduced significantly after a certain critical voltage drop is reached.

Figure 10:
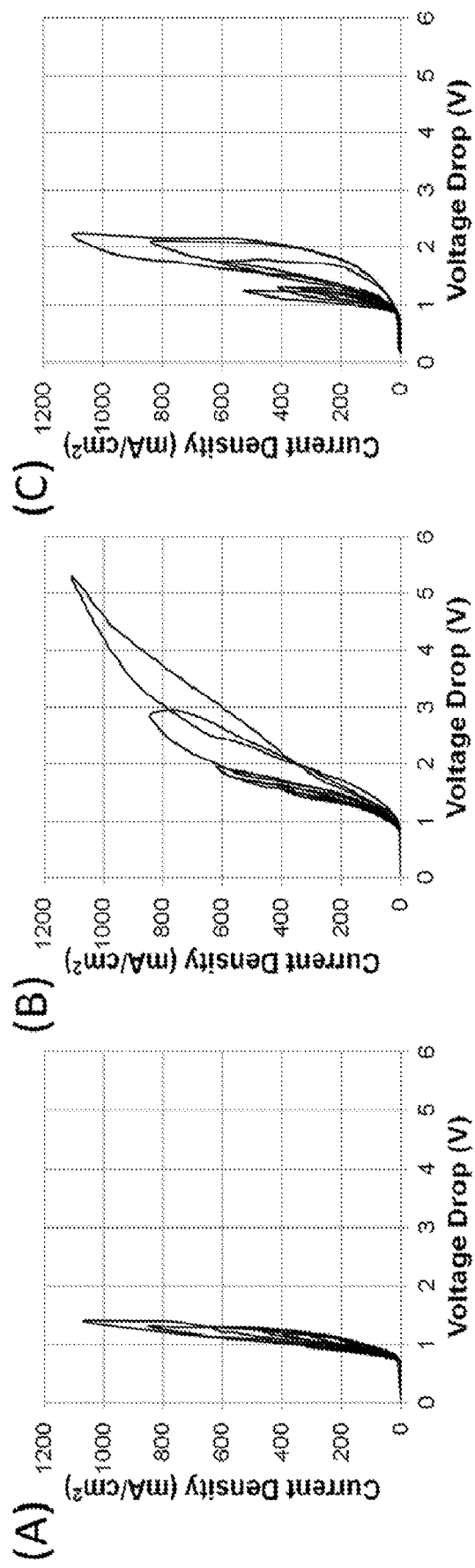
FIG. 10 shows a comparison of water splitting of three bipolar membranes at progressively increasing current density-cycling from 100 mA/cm$^2$ to 1000 mA/cm$^2$ in 0.5M $Na_2SO_4$ solution: (A) Electrospun three layer membrane (made by Protocol #2) with a 3D catalyzed junction (catalyzed by addition of $Al(OH)_3$ particles) according to embodiments of the invention; (B) a Fumasep FBM commercial bipolar membrane; (C) Electrospun membrane with a catalyzed junction made by Protocol #3 (catalyzed by addition of $Al(OH)_3$ particles) according to embodiments of the invention.
Figure 11:
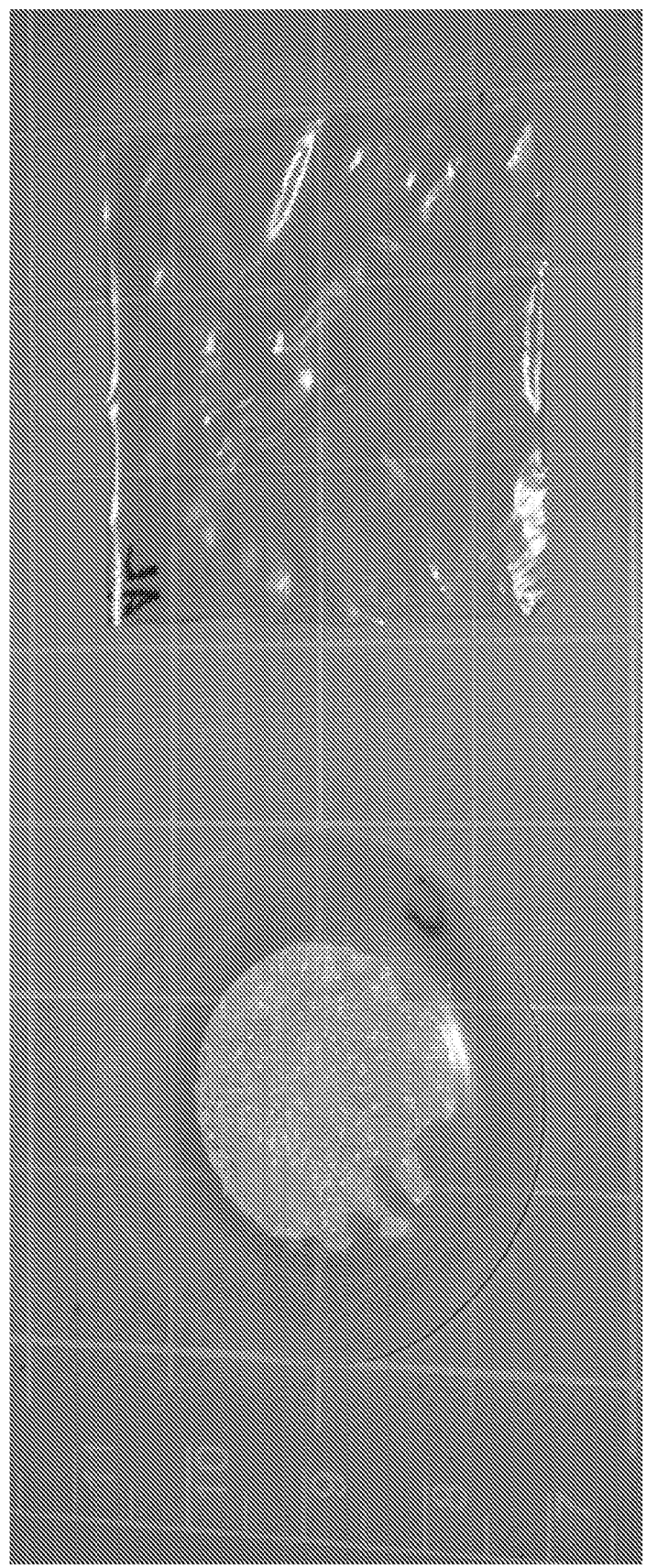
FIG. 11 shows photographs of bipolar membranes after a high current density water splitting polarization experiment, where the maximum current density was 1,100 mA/cm$^2$. A Fumasep® FBM membrane from Fumatech GmbH (left) showing blistering/degradation and a 3D junction electrospun membrane (right).

An important advantage of the new 3D junction BPM morphology is an improved resistance to delamination due to interpenetration and interlocking of cationic and anionic fibers. This is especially important at moderate/high operating current densities, where severe ion/water concentration gradients can create differential polymer swelling of the anion and cation exchange layers, leading to blistering (film separation) at the interfacial junction. The improved performance and mechanical stability of the 3D junction membrane (made by Protocol #2) is evident in the high current density polarization curves in FIG. 10. Membranes were evaluated for water splitting at room temperature using a current density cycling protocol where the maximum applied current density for a given polarization experiments was successively increased from 100 mA/cm$^2$ to 1100 mA/cm$^2$. For each polarization experiment, voltage data were recorded continuously with increasing and then decreasing current density at a current density scan rate of approximately 50 mA/cm$^2$/min, which was sufficiently slow to insure near steady-state conditions. As shown in FIG. 10A, the electrospun BPM with the 3D junction exhibited near reversible behavior up to 1,100 mA/cm$^2$, with essentially no change in the slope of the current density vs. voltage drop plots. When removed from the electrodialysis cell, the membrane showed no signs of physical deterioration (blistering), as evidenced by the photograph in FIG. 11. In contrast to the 3D interface BPM, the commercial Fumatech FBM membrane underwent severe irreversible damage at current densities above 600 mA/cm$^2$, as evidence by the large increase in transmembrane voltage drop (a voltage drop of more than 4.0 V at 1,100 mA/cm$^2$, FIG. 10B), which remained higher than normal when the current density was lowered to 100 mA/cm$^2$. Irreversible damage was confirmed by visual inspection, where numerous blisters were found on the membrane surface, indicating separation of the ion exchange layers of the BPM (see FIG. 11). The BPM made by Protocol #3 (FIG. 10C) worked better than the commercial Fumatech film, with a voltage drop of about 2.2 V at 1,100 mA/cm$^2$, indicating that there was some interpenetration of cation and anion exchange polymer fibers during membrane fabrication.

Briefly, the invention discloses, among other things, a bipolar membrane with a 3-D fibrous bipolar interface, where nano- or micro-fibers of one ion exchange polymer come in contact with an oppositely charged ion exchange polymer. Thus, this bipolar interface has a large area. The bipolar membrane can be used for industrial-scale electrodialysis separations and salt splitting, without membrane degradation.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in the description of this invention, are incorporated herein by reference in their entireties and to the same extent as if each reference was individually incorporated by reference.

Listing of References

[1]. S. Abdu, K. Sricharoen, J. E. Wong, E. S. Muljadi, T. Melin, and M. Wessling, Catalytic Polyelectrolyte Multilayers at the Bipolar Membrane Interface, ACS Appl. Mater. Interfaces, 5, 10445 (2013).

[2]. J. B. Ballengee and P. N. Pintauro, "Composite Fuel Cell Membranes from Dual-Nanofiber Electrospun Mats", Macromolecules, 44, 7307 (2011).

[3]. J. W. Park, R. Wycisk, P. N. Pintauro, Nafion/PVDF nanofiber composite membranes for regenerative hydrogen/bromine fuel cells, J. Membrane Sci. 490, 103 (2015).

[4]. A. Park, F. Turley, R. Wycisk, P. Pintauro, Diol-Crosslinked Electrospun Composite Anion Exchange Membranes, Journal of The Electrochemical Society 162(6) F560 (2015).

[5]. J. H. Hao, L. Yu, C. Chen, L. Li, and W. Jiang, Preparation of Bipolar Membranes. II. Journal of Applied Polymer Science, 82, 1733 (2001).

[6]. T. J. Zhou, R. Y. Chen, L. J. Chen, X. Chen, X. Zheng, and Z. Chen, Bipolar Membrane Modified by Cation/Anion Exchange Nanofibers Containing Copper Phthalocyanine Derivatives with Different Substituents, Fibers and Polymers, 15(1), 18 (2014).

[7]. J. Balster, S. Srinkantharajah, R. Sumbharaju, I. Pünt, R. G. H. Lammertink, D. F. Stamatialis, M. Wessling, Tailoring the interface layer of the bipolar membrane, Journal of Membrane Science 365, 389 (2010).

What is claimed is:

1. A bipolar membrane, comprising:
an internal 3-dimensional (3D) bipolar interface; and
a first layer, a second layer, and a third layer,
wherein the first layer comprises a cation exchange dense layer formed of one or more cation exchange polymers;
wherein the third layer comprises an anion exchange dense layer formed of one or more anion exchange polymers; and
wherein the second layer, disposed between the first layer and the third layer, comprises a mixture of at least one cation exchange polymer and at least one anion exchange polymer, such that an interface of the at least one cation exchange polymer and the at least one anion exchange polymer construes the internal 3D bipolar interface that has a large area, and wherein the at least one cation exchange polymer in the second layer is connected to the one or more cation exchange polymers of the first layer, and the at least one anion exchange polymer in the second layer is connected to the one or more anion exchange polymers of the third layer.

2. The bipolar membrane of claim 1, wherein the at least one cation exchange polymer in the second layer is same as or different from the one or more cation exchange polymers of the first layer, and the at least one anion exchange polymer in the second layer is same as or different from the one or more anion exchange polymers of the third layer.

3. The bipolar membrane of claim 1, wherein the internal 3D bipolar interface comprises a mixture of cation exchange and anion exchange nanofibers.

4. The bipolar membrane of claim 1, wherein the one or more cation exchange polymers of the first layer comprise at least one of polymers containing protogenic groups including sulfonic, sulfonimide, phosphonic and carboxylic, and their derivatives.

5. The bipolar membrane of claim 4, wherein the one or more cation exchange polymers of the first layer comprise at least one of poly(arylene ether sulfonic acid), poly(phenylsulfone sulfonic acid), poly(phenylene oxide sulfonic acid), poly(arylene sulfonic acid), poly(phosphazene sulfonic acid), sulfonated polybenzimidazole, perfluorosulfonic acid polymers, poly(vinylphosphonic acid), poly(acrylic acid), poly(methacrylic acid) and their copolymers, carboxyphenoxymethylpolysulfone, and their derivatives.

6. The bipolar membrane of claim 5, wherein the perfluorosulfonic acid polymers compress Nafion®, Aquivion®, or their derivatives.

7. The bipolar membrane of claim 4, wherein the one or more cation exchange polymers of the first layer comprise sulfonated poly(ether ether ketone) (SPEEK).

8. The bipolar membrane of claim 1, wherein the one or more anion exchange polymers of the third layer comprise at least one of polymers containing positive fixed charge groups including quaternary ammonium, guanidinium, phosphonium, and their derivatives.

9. The bipolar membrane of claim 8, wherein the one or more anion exchange polymers of the third layer comprise at least one of polymers based on polyarylene or on aliphatic hydrocarbon backbone.

10. The bipolar membrane of claim 8, wherein the one or more anion exchange polymers of the third layer comprises quaternized poly(phenylene oxide) (QPPO).

11. The bipolar membrane of claim 1, wherein the first layer comprises a mixture of two or more cation exchange polymers, and wherein the third layer comprises a mixture of two or more anion exchange polymers.

12. The bipolar membrane of claim 1, wherein each of the first layer and the third layer comprises uncharged particles for improving mechanical strength and/or increasing ionic conductivity, wherein the uncharged particles comprises graphene, graphene oxide, carbon nanotubes, short polymer fibers, and sulfonated or aminated polyhedral oligomeric silsesquioxane (POSS) nanoparticles.

13. The bipolar membrane of claim 1, wherein a polymer blend of an anion exchange ionomer with one or more charged or uncharged polymers is employed in any of the first, second and third layers.

14. The bipolar membrane of claim 1, wherein a polymer blend of a cation exchange ionomer with one or more charged or uncharged polymers is employed in the first, second and third layers.

15. The bipolar membrane of claim 1, wherein at least one of the first, second and third layers is further reinforced with polymer fibers being made of an ion-exchange or uncharged polymer including poly(phenyl sulfone) or poly(phenylene oxide), poly(vinylidene fluoride).

16. The bipolar membrane of claim 1, wherein the 3D bipolar interface comprises catalyst particles.

17. The bipolar membrane of claim 16, wherein the catalyst particles comprise inorganic and organic particles, or polymers.

18. The bipolar membrane of claim 17, wherein the catalyst particles comprise poly(vinyl pyridine), poly(ethylene imine), poly(vinyl alcohol), poly(acrylic acid), silica, functionalized silica, $Al(OH)_3$, $Fe(OH)_3$, $Fe_2O_3$, $Ca(OH)_2$, $Mg(OH)_2$, $FeCl_3$, $RuCl_3$, $Cr(NO_3)_3$, $ZrO_2$, sodium metasilicate, graphene oxide and polymers or particles with phosphoric or phosphonic acid groups.

19. The bipolar membrane of claim 1, wherein the internal 3D bipolar interface is a junction layer of interpenetrating polymer nanofibers or microfibers of anion-exchange polymer and cation-exchange polymer, with or without catalyst particles.

20. The bipolar membrane of claim 1, wherein the internal 3D bipolar interface is a junction layer of polymer nanofibers or microfibers of anion-exchange polymer or cation-exchange polymer embedded in a matrix of cation-exchange or anion-exchange polymers, respectively, with or without catalyst particles.

21. The bipolar membrane of claim 19, wherein the interpenetrating polymer fiber junction layer has no void space between the fibers.

22. The bipolar membrane of claim 19, wherein there is some void space between the interpenetrating polymer fibers in the junction layer.

23. A fuel cell, comprising at least one bipolar membrane according to claim 1.

24. An electrochemical device, comprising at least one bipolar membrane according to claim 1.

* * * * *